United States Patent [19]

Martz et al.

[11] E Re. 28,946

[45] Reissued Aug. 31, 1976

[54] BLOWER SYSTEM AND CONTROL SYSTEM THEREFOR

[75] Inventors: Lyle F. Martz, Verona; John W. Nanz, Pittsburgh, both of Pa.

[73] Assignee: Westinghouse Electric Corporation, Pittsburgh, Pa.

[22] Filed: Oct. 1, 1974

[21] Appl. No.: 510,966

Related U.S. Patent Documents

Reissue of:

[64] Patent No.: 3,695,774
Issued: Oct. 3, 1972
Appl. No.: 148,581
Filed: June 1, 1971

[52] U.S. Cl. ..... 415/17; 98/33 R; 165/16; 415/15; 417/295; 417/300

[51] Int. Cl.[2] ..... F01B 25/00

[58] Field of Search ..... 415/15, 17; 417/295, 417/300; 98/33 R, 33 A, 39; 165/16

[56] References Cited

UNITED STATES PATENTS 2,055,193 9/1936 Bischoff ..... 415/13

FOREIGN PATENTS OR APPLICATIONS 344,914 3/1931 United Kingdom ..... 165/16

*Primary Examiner*—C. J. Husar
*Attorney, Agent, or Firm*—S. A. Seinberg

[57] ABSTRACT

An automatic control system for high pressure blower applications prevents surging under variable supply flow rate requirements and achieves maximum efficiency of operation. The supply flow rate establishes the set point of a proportional plus reset controller, the latter receiving a feedback signal corresponding to the static discharge pressure of the supply blower and responding thereto for controlling the output of the supply blower. A return blower is controlled either through a characterizer relay in proportion to the control of the supply blower to maintain a fixed precalibrated relationship between supply and return flow rates or by a further proportional plus reset controller responsive to the supply flow rate, for establishing the set point thereof, and to the return flow rate, as a feedback signal thereto, for controlling the output of the return blower.

31 Claims, 2 Drawing Figures

POSITIONER
MANUAL AUTOMATIC CONTROL STATION
CHARACTERIZER RELAY
PROPORTIONAL RESET CONTROLLER
MANUAL AUTOMATIC CONTROL STATION
POSITIONER
DUCT PRESSURE TRANSMITTER
STATIC DUCT PRESSURE SENSOR
FLOW RATE TRANSMITTER
FLOW RATE SENSOR
A. C./ HEAT
POSITIONER
40'
42'
44'
90'
96
94
76'
78'
80'
72'
60'
62'
74'
64'
66'
68'
20'
18'
10'
12'
14'
56'
50'
52'
54'
92'
36'
32'
30'
34'
28'
26'
22'

BLOWER SYSTEM AND CONTROL SYSTEM THEREFOR

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to blower systems and blower control systems and, more particularly, to such systems for use in a ventilating installation for preventing surging while maintaining maximum efficiency of operation.

2. State of the Prior Art

Central air conditioning or ventilating installations, i.e., for both cooling and heating of air, as utilized in large buldings such as schools, office buildings and factories, typically utilize a central supply blower which is required to operate at a relatively high discharge pressure. Three inches to 30 inches of water are required to maintain an adequate flow rate of the air through the ventilating, i.e., air conditioning or heating, apparatus and ultimately through an arrangement of headers and dampers for distribution to the various individual rooms of the building supplied by the installations. As is also typical, a return is provided for exhausting air from the rooms and returning the thus exhausted air, usually mixed with a percentage of fresh air, through the air conditioning system to be recirculated.

A problem frequently encountered in such installations is known as surging. Very briefly, surging occurs when the supply flow rate diminishes but the discharge pressure remains relatively high. When this situation obtains, the supply blower stalls, in an aerodynamic sense, until the discharge pressure is reduced, at which time the supply blower again begins to generate a supply flow. If the required supply flow rate remains low, however, the discharge pressure again increases causing stalling to occur again. Unless controls are provided, the stalling repeats in a periodic manner until the system flow rate requirements increase. Numerous deleterious effects obtain from this surging condition. The resulting overloads on the blower, both as to the fan unit and the driving motor therefor, can destroy it. In addition, the periodic surging in the supply ducts which receive the discharge of the blower causes an undesirable bulging of the ducts with resultant, objectionable popping sounds, and may in fact destroy the ducts or substantially reduce their useful life.

SUMMARY OF THE INVENTION

The present invention overcomes these and problems of prior art ventilation systems, and other such systems utilizing high pressure blowers, and achieves maximum efficiency in operation.

In accordance with a first embodiment of the invention, means are provided for sensing the air supply flow rate and the static duct pressure in the main duct receiving the discharge of the supply blower. A control system, preferably including a proportional plus reset controller, responds to the supply flow rate to establish a set point for its control function. The control system further responds to the static duct pressure as a feedback signal which is compared to the set point signal and it generates an output control signal for automatically controlling the output air flow from the supply blower. The output control signal adjusts the output flow of the supply blower in accordance with the varying air requirements of the installation, and correspondingly maintains the blower discharge pressure at a value functionally related to the supply flow rate such that surging is prevented while maximum efficiency is attained.

The supply flow of air then typically passes through a conditioning system, e.g. for heating or cooling, and then through a header for distribution to the various rooms to be services. A return blower operates to exhaust the air from the rooms thus supplied, and return the air typically mixed with a predetermined proportion of fresh air to the supply blower, in a continuing cycle.

In accordance with a first embodiment of the invention, the control system includes a further proportional plus reset controller associated with the return system to respond to the supply flow rate and establish a set point of operation with the return fan flow rate as a feedback signal. An output control signal is generated to adjust the output of the return blower and achieve a desired relationship of the return and supply flow rates. In accordance with a second embodiment of the invention, the return blower is controlled through a characterization function, preferably by marks of a characterizer relay, in response to the proportional plus reset control output for the supply system, thereby to maintain a fixed precalibrated relationship between the return and supply systems.

The system of the invention is highly effective in operation, positively preventing surging while assuring supply flow rates under varying demands and affording maximum efficiency of operation. As specifically disclosed herein, the system is preferably implemented through use of pneumatic sensing, transmitting, and control components to be of relatively simplified form, thereby affording low cost of installation and simplified maintenance. However, the invention may be embodied with electronic digital and/or analog elements in a digital computer or other electronic control system.

BRIEF DESCRIPTION OF THE DRAWINGS

In FIG. 1, a supply blower 10 is shown diagrammatically to include a fan-like element 12, driven through a pulley and belt arrangement from an electric motor 14, and a system of movable louvers 16. Duct 18 receives the discharge or output of the supply blower 10 and conveys that output to an air conditioning system 20, which may be for cooling and/or heating of the air supplied to it. A facility or building 22 serviced by the system is shown to include a plurality of individual rooms 22a through 22f each of which receives an individual supply of the conditioned air by distribution through a header system 24. With reference only to the system as illustrated for the room 22a, since the others are identical, a duct 26 conveys the air from the header 24 and through a damper 28 to the interior of the room. A thermostat 30 responds to the temperature conditions obtaining in the room to automatically adjust the damper 28 to obtain a desired rate of supply of air to the room 22a. The spent air in the room is exhausted through a ventilator 32 associated with a return header 34, and is supplied by duct 36 to the return blower 40.

Figure 1:
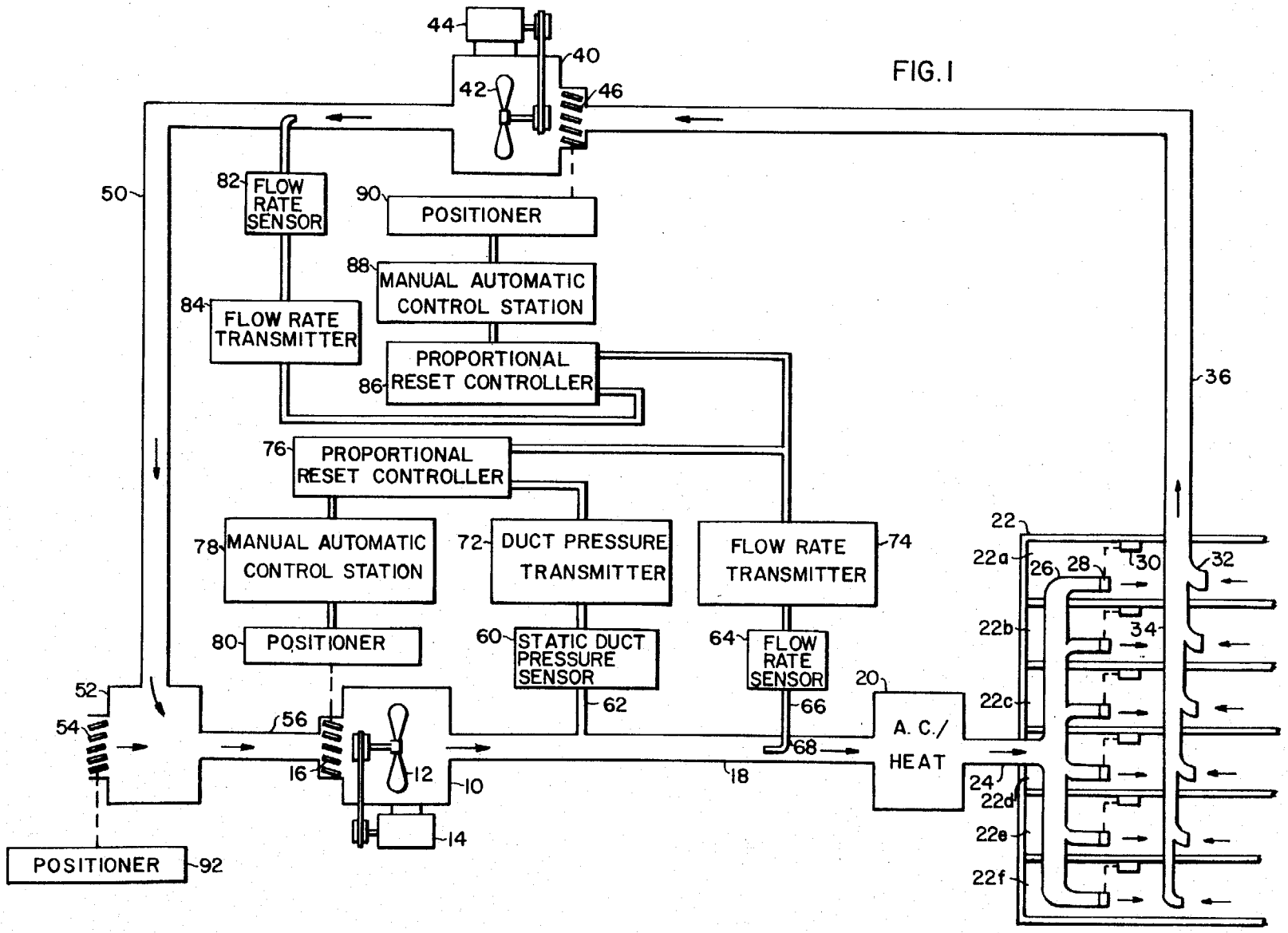
FIG. 1 comprises a block diagram of a first embodiment of the system of the invention.

The facility 22, in a practical application, will typically include many more separate rooms than are illustrated herein; in fact, it is to be appreciated that the system of the invention is for use with relatively large installations imposing very high supply rate requirements for attaining the necessary cooling and/or heating effects. It will also be understood that whereas, for simplicity and clarity of presentation, only a single header and distribution system are shown, separate duct work for cooling and for heating may be provided for servicing each of the individual rooms. In that event, separate dampers or other controls such as a combination of dampers and baffles may be provided to permit the necessary selective control of the temperature conditions. It likewise will be appreciated that the invention may be applied to any ventilating system using high pressure blowers, and thus is not limited to use with only air conditioning and heating systems.

The return blower 40 may be similar to the supply blower and thus includes adjustable louvers 46 and a fan-like element 42 driven through a belt and pulley system from and electric motor 44. The return blower 40 creates a return flow, as indicated by the arrows through the duct 36, which proceeds from the blower 40 through the duct 50 to a chamber 52 where the entry of a desired amount of fresh air is permitted through adjustable louvers 54 and duct 56 to the supply blower 10.

A sensor 60 communicates through conduit 62 with the interior of duct 18 for measuring the static pressure within the duct. A further sensor 64 communicates through conduit 66 associated with a pitot tube 68 to respond to the supply air flow rate within the duct 18. The sensor 64 may therefore include a connection similar to that associated with conduit 62 to the duct 18, to produce a pressure differential signal proportional to the supply flow rate.

The static pressure measured by sensor 60 from the duct 18 corresponds substantially identically to the discharge pressure or plenum chamber pressure produced by the supply blower 10, since the portion of the system from the blower 10 to the air conditioning/heating unit 20 is closed. This pressure, in a typical system, ranges from 1 inch to 30 inches W.C. It will be appreciated that any of various suitable devices may be utilized to measure the static pressure, as well as the flow rate, as represented by the sensors 60 and 64, respectively.

Duct pressure and flow rate transmitters 72 and 74 receive the output of their associated sensors and transmit corresponding signals preferably to a proportional plus reset controller 76. Each of the transmitters 72 and 74 is a commercially available unit, capable of *adjustably* responding to the relatively weak pressure representative signals produced by its associated sensor and producing a corresponding output signal of substantially increased strength. An example of such a transmitter is known as the D-33 Head Ratio Totalizer, manufactured by Westinghouse Electric Corporation, the assignee herein. *Thus, the output signals of transmitters 72 and 74 can be adjusted for calibration purposes.*

*Furthermore, as in the present invention, the output of transmitters 72 and 74 can be tuned with respect to one another so that, for a particular system, a predetermined relationship between the supply flow rate and the discharge pressure of supply blower 10 can be readily established.*

The proportional reset controller 76 is a pneumatically operated force-balance device and in the particular application herein responds to the pneumatic input signals from the transmitters 72 and 74 to convert these into a single pneumatic output signal. In particular, the pressure differential signal from the flow rate transmitter 74 is supplied to the controller 76 as a set point signal and the duct pressure signal from transmitter 72 is supplied as a feedback signal to the controller 76. In response thereto, the controller 76 produces a pneumatic output signal which is proportionately and integrally related, as desired, to the difference between the feedback and set point signals. The proportional plus reset controller 76 is likewise a commercially available unit and as an example thereof, such a unit is manufactured by Westinghouse Electric Corporation and known as the Hagan Ratio Totalizer.

The pneumatic output signal of the controller 76 then is supplied to a manual-automatic control station 78, the output of which is supplied to a positioner 80; each of these units likewise comprises a commercially available unit and may be the types manufactured by Westinghouse Electric Corporation.

The control station 78 is utilized intermediate the primary controller 76 and the final control unit, herein the positioner 80, to permit selection of either manual or automatic control of the latter, and thus of the final, controlled element — in this instance, the louvers 16. The mechanical positioning of those louvers is diagrammatically illustrated by the dotted line connecting the louvers 16 to the positioner 80. Selection means provided in the station 78 conveniently permit manual control of the positioner 80 which may be remotely located from the station 78. Since the mechanical connection of the positioner 80 and the louvers 16 typically requires those elements to be relatively adjacent one another, they typically will be remote from the station 78 which, by contrast, is typically more desirably located at the control station for the overall system. Conversely, and particularly in the normal operation of the system of the invention, the station 78 is set to operate automatically. In that instance, a transfer valve assembly in the station 78 responds to the pneumatic signal of controller 76 to effectively transfer that same signal to the positioner 80; the latter then converts the pneumatic input signal to a mechanical output, thereby to effect appropriate positioning of the louvers 16 as required by the output signal from controller 76.

In operation, each of the dampers 28 in the rooms serviced by the installation is adjusted individually by its associated thermostat 30 to attain a desired condition. There results varying supply flow rate requirements for each room, and thus for the total supply flow rate as experienced through the duct 18. That varying flow rate is sensed by sensor 64 and transmitted by transmitter 74 to the controller 76 for establishing a varying set point. The duct pressure, varying in response to the flow rate and other conditions, is sensed by sensor 60 and transmitted by transmitter 72 to controller 76 as a feedback signal. The controller 76 then produces the control signal output, proportionally and integrally related, as desired, to these input signals, and transferred by station 78, when set for automatic operation to actuate positioner 80 to adjust the louvers 16. As the supply air flow rate requirements decrease and the discharge pressure of the supply blower 10 begins to increase, the louvers 16 are adjusted correspondingly to reduce the output of the blower 10 and thus maintain the discharge pressure at a value related to the supply air flow rate so as to prevent surging from occurring. Similarly, as the supply air flow rate requirements increase resulting in a decrease of the discharge pressure, the louvers 16 are adjusted to a more open condition, thereby increasing the output of the blower 10 and maintaining the requisite discharge pressure to insure an adequate air flow rate to satisfy the ventilation requirements.

In the return system, the problem of surging typically is not present since the return blower 40 exhausts to atmospheric pressure. However, for maximum efficiency of the overall ventilating system, it is preferred that the return flow rate be maintained at some predetermined percentage of the supply flow rate, such as 90 percent. A flow rate sensor 82 responds to the return flow rate and, through transmitter 84, supplies a pneumatic signal representative thereof preferably to a proportional plus reset controller 86, as a feedback signal. *As previously noted in connection with the description of transmitters 72 and 74, transmitter 84 can be tuned with respect to transmitter 72, so that a predetermined relationship between the supply and return flow rates can be Readily established.* Controller 86 receives as a set point the output of the supply flow rate transmitter 74 and in response to these two input signals produces a pneumatic output control signal for application to a manual-automatic control station 88. The units 82, 84, 86 and 88, as well as positioner 90, may comprise units identical to the units 64, 74, 76, 78 and 80, respectively.

Accordingly, station 88, when set for automatic operation, supplies the proportional plus reset output control signal from controller 86 to positioner 90 to adjust the louvers 46 of the return air system 40. The controller 86 thus sets the louvers 46 so as to establish the return flow rate at the desired and preferably predetermined proportion of the supply flow rate.

Typically, as noted, the return flow rate is less than the supply flow rate and thus fresh air normally is introduced into the system, as afforded by chamber 52 and louvers 54. Louvers 54 may be adjusted directly, or a positioner 92 may be provided to permit remote control. Further, automatic control of positioner 92 may be afforded such as by a further output from the proportional plus reset controller 76 or a similar controller suitably provided.

The system of the invention thus affords coordinated control of the supply and return blowers to assure maximum efficiency of operation while maintaining the requisite supply flow rates as required by ventilation requirements of the installation serviced by the system and assuring that surging cannot occur regardless of flow rate variations.

Figure 2:
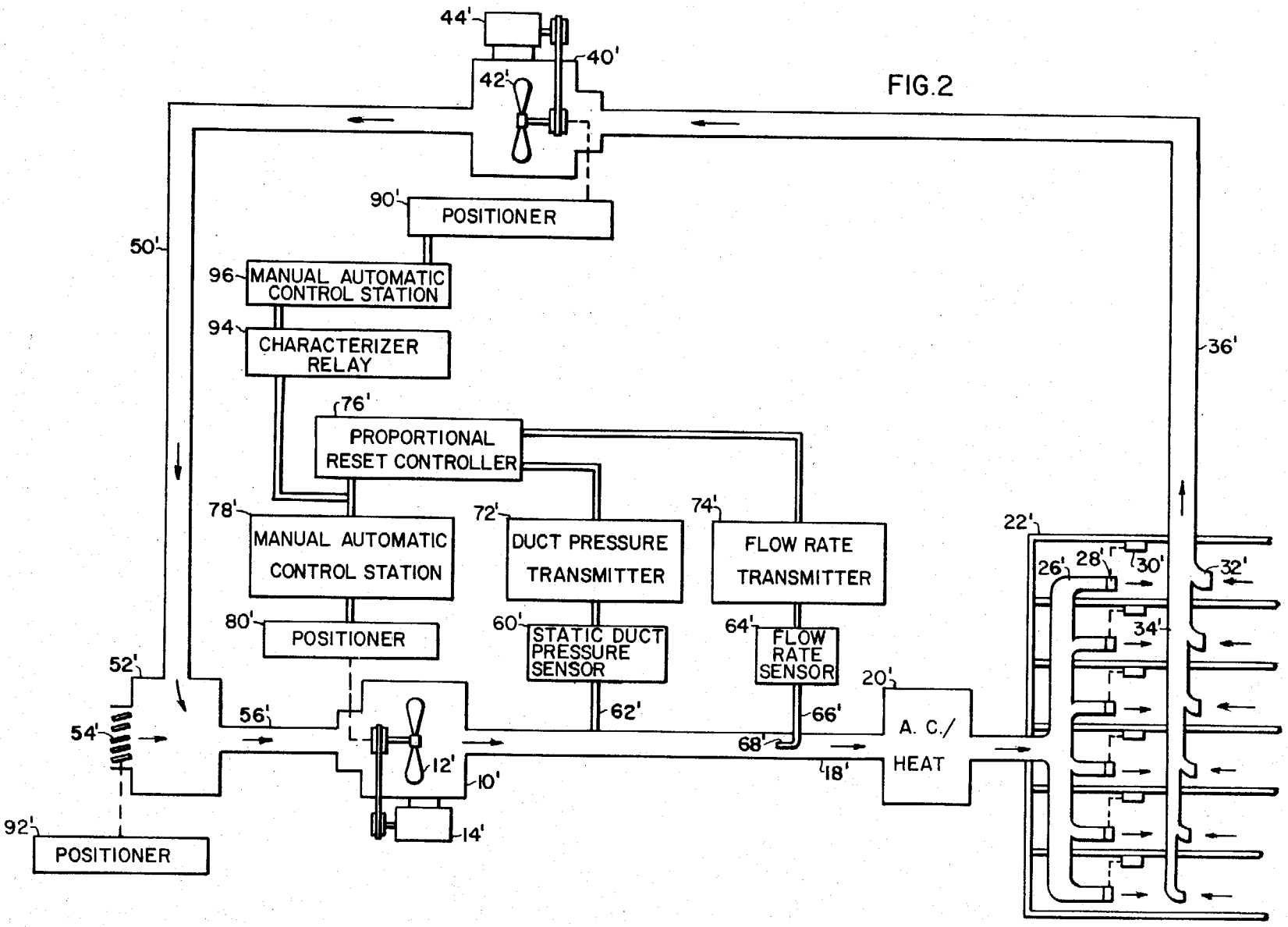
FIG. 2 comprises a block diagram of a second embodiment of the invention.

The system of FIG. 2 is substantially identical to that of FIG. 1 as to the supply and thus corresponding elements are identified by identical, but primed, numerals. A primary difference in the supply as shown in FIG. 2 is that the fan 12' of blower 10' has variable pitch blades, control of the pitch being diagrammatically illustrated by the dotted line connection from the positioner 80'. Blowers incorporating variable pitch blades of this type are commercially available and thus further details are not herein described. The return system in FIG. 2 similarly includes a return blower 40', the blades 42' of which are of variable pitch as controlled by positioner 90'. The louvers in each of the air supply systems thus are eliminated in FIG. 2 as compared with FIG. 1.

In FIG. 2, the control signal for positioner 90', for controlling the pitch of the blades 42' of the return blower and thus the return flow rate, is generated by characterizer relay 94, a commercially available mechanism which may be adjusted to establish and output signal as a desired percentage of an input signal. Relay 94 receives the control output of controller 76', and thus provides an output pneumatic control signal to the manual-automatic control station 96, which is desired proportion of the control signal for the supply blower 10'. The manual-automatic control station 96 may be similar to the station 78', and thus selectively may afford either manual control, or automatic response to the output of the characterizer relay 94 for control of the positioner 90'. Thus, in the system of FIG. 2, it is assumed that the characteristics of the return blower 40' correspond sufficiently closely to those of the supply blower 10' such that adjustment thereof in predetermined proportion to the adjustment of the supply blower achieves the desired precalibrated relationship between the supply and return flow rates.

The advantage of the system of FIG. 2 correspond to those of FIG. 1 as above described, but in addition, additional cost savings are realized in view of the simplified return portion of the control system of FIG. 2 as compared with FIG. 1. It will be apparent that the system of FIG. 1 may incorporate variable pitch blower fans as in FIG. 2 in lieu of the louver control, as shown, and that the simplified return control system of FIG. 2 may be used as well in the system of FIG. 1.

As examples of typical operating conditions and installations to which the control system of this subject invention relates, flow rates typically range from 60,000 to 100,000 cubic feet of air per minute, the return flow specified above as being 90 percent of the supply may, in fact, range from approximately 70 percent to slightly in excess of 90 percent. Likewise as above noted, the static pressure which is measured and corresponds to the discharge pressure or plenum chamber pressure produced by the supply blower ranges from 1 inch to 30 inches.

Numerous modifications and adaptations of the system of the invention will be apparent to those skilled in the art. It is accordingly desired that the invention be interpreted to embrace all such modifications and adaptations which fall within the true spirit and scope of the invention.

What is claimed is:

1. A blower control system comprising:

first means for sensing the supply flow rate produced by a supply blower and generating an output *signal* representative thereof, second means for sensing the discharge pressure produced by the supply blower and generating an output *signal* representative thereof, control means responsive to [the outputs] *said output signals* of said first and second sensing means for producing a control output *signal* dependent on the difference between a desired relationship and the sensed relationship of the supply flow rate and the discharge pressure of the supply blower, *the output signal representative of the supply flow rate being utilized as a varying set point by said control means in producing said control output signal*, and adjustment means responsive to [the] *said* control output *signal* for adjusting the output of [said] *the* supply blower to attain said desired relationship of the supply flow rate and the discharge pressure of [said] *the* supply blower.

2. A blower control system as recited in claim 1, wherein:

said control means includes means for presetting therein [the] *said* desired relationship of the supply flow rate and the discharge pressure, and said control means responds [to said supply flow rate representative output of said first means to establish a set point of operation, and] to said discharge pressure repesentative output *signal* of said second means as a feedback signal, for producing [the] *said* control output *signal* thereof.

3. A blower control system as recited in claim 1, wherein there is further provided first and second transmitting means associated with said first and second sensing means, respectively, for transmitting the respective outputs thereof to said control means.

4. A blower control system as recited in claim 1, wherein said adjustment means comprises:

mechanically adjustable means associated with said supply blower and adapted for actuation to adjust the output thereof, and means responsive to the control output of said control means for producing a corresponding mechanical actuation for adjusting said mechanically adjustable means.

5. A blower control system as recited in claim 4, wherein said mechanically adjustable means comprise a system of louvers adjustable to vary the inlet air supply to said supply blower.

6. A blower control system as recited in claim 4, wherein said mechanically adjustable means comprise means for adjusting the pitch of the blades of a fan of the supply blower.

7. A blower control system as recited in claim 4, wherein there is further provided:

means selectively operable to automatically transmit a signal received thereby and to be manually set to generate and transmit a signal, said selectively operable means being connected to receive the output of said control means and to transmit an output thereof to said adjustment means and effective when set for automatic operation to transmit the control output of said control means to said adjustment means and when selectively set for manual operation to develop and transmit a manually set signal to said adjustment means for adjusting the output of said supply blower.

[8. A blower control system as recited in claim 1, wherein there is further provided:

a return blower for exhausting air from a facility supplied by the output of said supply blower and returning the exhausted air to said supply blower for recirculation; and control means for said return blower responsive to the supply flow rate for producing a return control output related thereto for establishing a desired relationship of the return flow rate and the supply flow rate, and adjustment means responsive to the return control output for adjusting the output of said return blower to attain said desired relationship of the supply and return flow rates.]

9. A blower control system as recited in claim [8] *32*, where there is further provided:

third means for sensing the return flow rate produced by the return blower and generating an output representative thereof, and said return control means responds to said supply flow rate representative output of said first sensing means to establish a set point of operation and to said return flow third representative output of said third sensing means as a feedback signal, for producing the return control output.

[10. A blower control system as recited in claim 9, wherein there is further provided third transmitting means associated with said third sensing means for transmitting the output thereof to said third control means.]

11. A blower control system as recited in claim [8] *32*, wherein said return control means comprises characterizer relay means responsive to the control output of said supply control means for producing the return control output in accordance with a predetermined relationship to said supply control output.

12. A blower control system as recited in claim [8] *32*, wherein said adjustment means comprises:

mechanically adjustable means associated with said return blower and adapted for actuation to adjust the output thereof, and means responsive to the control output of said return control means for producing a corresponding mechanical actuation for adjusting said mechanically adjustable means associated with said return blower.

13. A blower control system as recited in claim [8] *32*, wherein [said adjustment means comprises] *there is further provided:* means selectively operable to automatically transmit a signal received thereby and to be manually set to generate and transmit a signal, said selectively operable means being connected to receive the output of said return control means and to transmit an output thereof to said adjustment means and effective when set for automatic operation to transmit the control output of said return control means to said adjustment means and when selectively set for manual operation to develop and transmit a manually set signal to said adjustment means for adjusting the output of said return blower.

14. A system as recited in claim 1, wherein:

said first and second means produce pneumatic signals representative of the sensed supply flow rate and discharge pressure, respectively, and said control means responds to the pneumatic output signals of said first and second means to produce a pneumatic control signal.

15. A blower control system as recited in claim 14, wherein said first sensing means produces a pressure differential pneumatic output signal corresponding to the supply flow rate.

16. A blower control system as recited in claim 15, wherein said first sensing means comprises a pitot tube.

*17. A blower control system as recited in claim 1 wherein said control means includes means for presetting therein said desired relationship of the supply flow rate and the discharge pressure.*

*18. A blower system as recited in claim 1, wherein said control means responds to said discharge pressure representative output signal of said second means as a feed-*

*back signal, for producing said control output signal thereof.*

*19. A blower control system as recited in claim 1, wherein there is further provided means selectively operable to automatically transmit a signal received thereby and to be manually set to generate and transmit a signal, said selectively operable means being connected to receive said output signal of said control means and to transmit an output thereof to said adjustment means and effective when set for automatic operation to transmit said control output signal of said control means to said adjustment means and when selectively set for manual operation to develop and transmit a manually set signal to said adjustment means for adjusting the output of the supply blower.*

*20. A blower control system comprising:*

*first means for sensing the supply flow rate produced by a supply blower and generating an output signal representative thereof,*

*second means for sensing the discharge pressure produced by the supply blower and generating an output representative thereof,*

*first control means responsive to said output signals of said first and second sensing means for producing a control output signal dependent on the difference between a desired relationship and the sensed relationship of the supply flow rate and the discharge pressure of the supply blower,*

*first adjustment means responsive to said control output signal of said first control means for adjusting the output of the supply blower to attain said desired relationship of the supply flow rate and the discharge pressure of the supply blower,*

*third means for sensing the return flow rate produced by a return blower and generating an output signal representative thereof,*

*second control means responsive to said output signals of said first and third sensing means for producing a control output signal dependent on the difference between a desired relationship and the sensed relationship of the supply and return flow rates, and*

*second adjustment means responsive to said control output signal of said second control means for adjusting the output of the return blower to attain said desired relationship of the supply and return flow rates.*

*21. A blower control system as recited in claim 20, wherein said first control means utilizes the output signal representative of the supply flow rate as a varying set point and the output signal representative of the discharge pressure of the supply fan as a feedback signal in producing said control output signal thereof.*

*22. A blower control system as recited in claim 21, wherein said second control means utilizes the output signal representative of the supply flow rate as a varying set point and the output signal representative of the return flow rate as a feedback signal in producing said control output signal thereof.*

*23. A blower control system as recited in claim 20, wherein said second control means utilizes the output signal representative of the supply flow rate as a varying set point and the output signal representative of the return flow rate as a feedback signal in producing said control output signal thereof.*

*24. A blower control system as recited in claim 21 wherein said first control means includes means for presetting therein said desired relationship of the supply flow rate and the discharge pressure of the supply blower.*

*25. A blower control system as recited in claim 23 wherein said second control means includes means for presetting therein said desired relationship of the supply and return flow rates.*

*26. A blower control system as recited in claim 22 wherein:*

*said first control means include means for presetting therein said desired relationship of the supply flow rate and the discharge pressure of the supply blower, and*

*said second control means includes means for presetting therein said desired relationship of the supply and return flow rates.*

*27. A blower control system as recited in claim 26 wherein said first and second adjustment means each respectively comprises:*

*mechanically adjustable means associated respectively with the supply blower and the return blower and adapted for actuation to independently adjust the outputs thereof, and*

*means respectively responsive to the control output signals of said first and second control means for producing a corresponding mechanical actuation for adjusting said respective mechanically adjustable means.*

*28. A blower control system as recited in claim 27 wherein said mechanically adjustable means comprises a system of louvers adjustable to vary the inlet air supply to the supply and return blowers.*

*29. A blower control system as recited in claim 27 wherein said mechanically adjustable means comprises means for adjusting the pitch of the blades of a fan of the supply and return blowers.*

*30. A blower control system as recited in claim 27 wherein there is further provided, in association with each of said first and second adjustment means, means selectively operable to automatically transmit a signal received thereby and to be manually set to generate and transmit a signal, said selectively operable means being connected to receive respectively said control output signals of said first and second control means and to transmit an output thereof to the adjustment means with which said selectively operable means is associated and effective when set for automatic operation to transmit said control signal output of said respectively connected control means to said associated adjustment means and when selectively set for manual operation to develop and transmit a manually set signal to said associated adjustment means for adjusting the output of the supply and return blowers.*

*31. A blower control system as recited in claim 20 wherein there is further provided, in association with each of said first and second adjustment means, means selectively operable to automatically transmit a signal received thereby and to be manually set to generate and transmit a signal, said selectively operable means being connected to receive respectively said control output signals of said first and second control means and to transmit an output thereof to the adjustment means with which said selectively operable means is associated and effective when set for automatic operation to transmit said control signal output of said respectively connected control means to said associated adjustment means and when selectively set for manual operation to develop and transmit a manually set signal to said associated adjustment means for adjusting the output of the supply and return blowers.*

*32. A blower control system comprising:*

*first means for sensing the supply flow rate produced by a supply blower and generating an output representative thereof,*

*second means for sensing the discharge pressure produced by the supply blower and generating an output representative thereof,*

*control means responsive to the outputs of said first and second sensing means for producing a control output dependent on the different between a desired relationship and the sensed relationship of the supply flow rate and the discharge pressure of the supply blower,*

*adjustment means responsive to the control output of said control means for adjusting the output of said supply blower to attain said desired relationship of the supply flow rate and the discharge pressure of said supply blower,*

*a return blower for exhausting air from a facility supplied by the output of said supply blower and returning the exhausted air to said supply blower for recirculation; and*

*control means for said return blower responsive to the supply flow rate for producing a return control output related thereto for establishing a desired relationship of the return flow rate and the supply flow rate, and*

*adjustment means responsive to the return control output for adjusting the output of said return blower to attain said desired relationship of the supply and return flow rate.*

*33. A blower control system as recited in claim 9, wherein there is further provided third transmitting means associated with said third sensing means for transmitting the output thereof to said return control means.*

* * * * *